(12) United States Patent
St. Hillaire et al.

(10) Patent No.: US 6,788,266 B2
(45) Date of Patent: Sep. 7, 2004

(54) DIVERSITY SLOT ANTENNA

(75) Inventors: Brian St. Hillaire, San Jose, CA (US); Doug Kough, San Jose, CA (US); Bryan Kretsch, Aptos, CA (US); Peter Fine, Santa Cruz, CA (US)

(73) Assignee: Tyco Electronics Logistics AG, Steinach (CH)

( * ) Notice: Subject to any disclaimer, the term of this patent is extended or adjusted under 35 U.S.C. 154(b) by 94 days.

(21) Appl. No.: 10/133,248

(22) Filed: Apr. 26, 2002

(65) Prior Publication Data

US 2003/0020662 A1 Jan. 30, 2003

Related U.S. Application Data

(60) Provisional application No. 60/287,185, filed on Apr. 27, 2001.

(51) Int. Cl.[7] .............................................. H01Q 13/10
(52) U.S. Cl. ...................................... 343/770; 343/830
(58) Field of Search ............................. 343/767, 770, 343/830, 893

(56) References Cited

U.S. PATENT DOCUMENTS

| | | | |
|---|---|---|---|
| 3,127,609 A | 3/1964 | Wentworth | 343/708 |
| 6,031,503 A | 2/2000 | Preiss, II et al. | 343/770 |

FOREIGN PATENT DOCUMENTS

| | | |
|---|---|---|
| DE | 29920240 U1 | 12/2000 |
| EP | 0669672 A1 | 8/1995 |
| EP | 0701296 A1 | 3/1996 |

OTHER PUBLICATIONS

Manshadi, F., "Small Crossed–Slot Radiating Elements for Phased Array Applications," Jet Propulsion Laboratory, California Institute of Technology, pp. 1828–1831.

PCT International Search Report, dated Nov. 29, 2002, 4 pages.

Primary Examiner—Shih-Chao Chen
(74) Attorney, Agent, or Firm—Fulbright & Jaworski L.L.P.

(57) ABSTRACT

Disclosed is a high performance, low cost antenna for wireless communication applications which benefit from a dual feed diversity antenna. The antenna device can be fabricated from a single layer of conductive material, thus allowing easy, low cost manufacture of a high gain antenna. Antenna embodiments may provide both spatial and polarization diversity. The antenna need not be planar, but rather may be bent or formed, such as to provide an antenna which is conformal with the shape of a wireless communication device. Furthermore, other embodiments of the present invention may be made of thin film, conductive foil, vapor deposition, or could be made of a flexible conductive material, such as metallized MYLAR. Each of the slot elements may be linear or may be formed in a meander shape or other shape to reduce size. The slot elements may be provided within an antenna array useful for beam scanning applications.

21 Claims, 5 Drawing Sheets

DIVERSITY SLOT ANTENNA

CROSS REFERENCE TO RELATED APPLICATION

This application claims the benefit of priority of U.S. Ser. No. 60/287,185, filed Apr. 27, 2001, pursuant to 35 U.S.C. §119, the disclosure of which is incorporated in its entirety by reference herein.

BACKGROUND OF THE INVENTION

Other diversity antenna devices have typically used two separate antennas. Previous related diversity antennas, such as taught in U.S. Pat. No. 6,031,503 and 6,052,093 (both incorporated in their entireties by reference herein) typically include one or more circuit board type dielectric substrate layers with one or more layers of conductive material such as plated copper, which is then processed to create the desired features in the conductive layers, such as by photolithography followed by etching in a corrosive acid bath. These related antenna methods are somewhat expensive to produce as requiring the use of expensive processing equipment and harsh chemicals for lithography, plating and etching. Furthermore, related antenna types typically employ multiple layers of conductive material. U.S. Pat. Nos. 5,717,410; 5,166,697; 5,943,020; and 5,406,292 are incorporated in their entireties by reference herein.

One object of the present invention is to provide a high performance, low cost antenna which is easily manufactured.

Another object of the present invention is to provide a flat, compact, diversity antenna without the use of harsh chemicals for plating, lithography and etching.

Another object of the invention is to provide a high performance, low cost diversity antenna from a single layer of conductive material.

Another object of the invention is to provide an antenna with spatial diversity.

Another object of the invention is to provide an antenna with both spatial and polarization diversity.

Another object of the invention is to provide slot elements within an antenna array useful for beam scanning applications.

Another object of the invention is to provide a high performance, low cost antenna which uses separate feed lines to each of the diversity antenna segments.

Another object of the invention is to provide a high performance, low cost diversity antenna which can further include a through-hole or crimp to mark the location of the 50 ohm feed point and to easily and inexpensively ensure proper location of the feedline(s) for impedance matching during mass assembly. An antenna with uniform performance is provided for wireless communication devices.

SUMMARY OF THE INVENTION

The present invention provides for a high performance, low cost diversity antenna which can be produced as a one-piece, single layer of conductive material. The conductive material may be stamped from sheet metal, foil or the like, to form the appropriate features required to produce the desired frequency band response. Numerous means of manufacturing can be employed to produce the invention. Manufacturing processes of particular significance include metal stamping process. Stamped metal embodiments of an antenna structure according to the present invention may be efficiently and economically produced. Descriptions of these embodiments are in no way meant to limit the scope of the invention, as any number of manufacturing methods known or developed by those skilled in the art can be employed. Such methods may include but are not limited to stamping, etching or milling of conductive sheets, thin conductive foil, milled, stamped or cut to specification, such as copper or aluminum foil. The invention may also be produced by deposited as a thin film, such as copper vapor deposition directly onto the housing of the wireless communication device, as well as other methods known or developed by those skilled in the art

DETAILED DESCRIPTION

Figure 1:
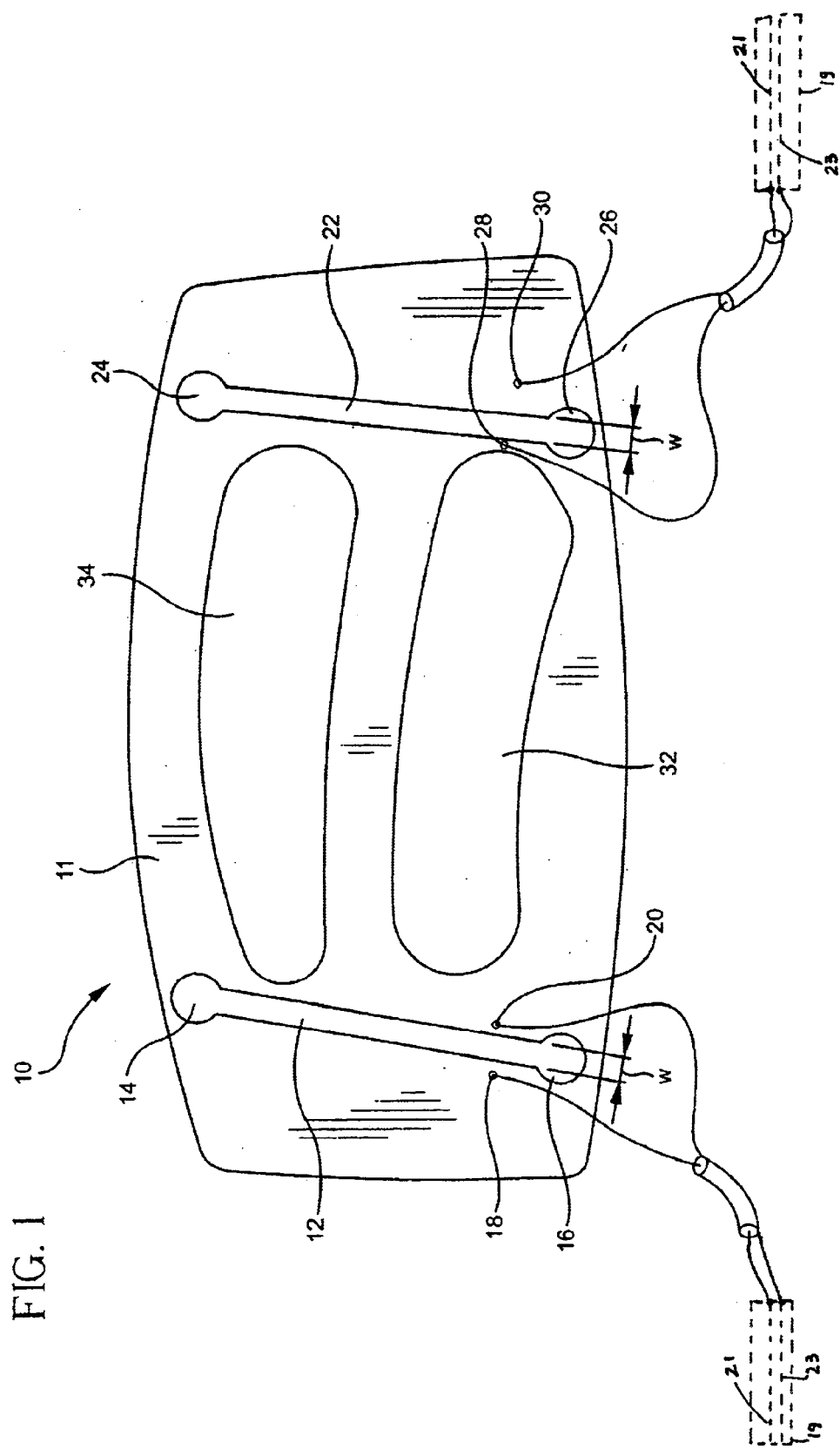
FIG. 1 illustrates a substantially planar embodiment of a single layer spatial diversity antenna.

FIG. 1 illustrates a substantially planar embodiment of a single layer spatial diversity antenna device 10. As previously stated, the antenna device can be fabricated using thin sheet metal such as copper, brass, or tin-plated steel, or other conductive materials as would be known to those skilled in the art. In a preferred embodiment, tin-plated steel having steel thickness on the order of 0.010 inch and tin plating thickness on the order of 0.001 inch is used. The conductive sheet 11 can be shaped and the proper features produced using common manufacturing techniques known in the art. Two such manufacturing methods which are commonly know in the art would be milling and stamping, although other methods which are capable of producing the desired features could also be employed. The primary features which are needed to produce the antenna device 10 from a conductive sheet 11 are the driven slots 12 and 22. The frequency band is primarily controlled by the electrical length of the slots 12 and 22 which are cut, stamped, or formed out of, or otherwise defined upon the sheet of conductive material 11.

In the illustrated embodiment which is designed for the IEEE 802.11 wireless communication protocol with the frequency band centered around 2.4 GHz, the slots 12 and 22 would, if created as simple straight slots, be too long for the antenna device 10. Thus the rounded, oversized ends 14 and 16 for slot 12 and the rounded, oversized ends 24 and 26 of the slot 22 have the function of increasing the effective electrical length of the slots 12 and 22. Thus, in this embodiment, a reduced size of conductive sheet can be employed to produce the antenna device 10 which features a frequency band lower than would normally be enabled by simple straight oval or rectangular slots. These rounded end features 14, 16, 24 and 26 as described can be used to reduce the overall size of the antenna device 10. The width, "w," of the slots 12 and 22 can be adjusted for tuning the performance of the antenna device 10 which may be necessary due to variations in the size dimensions and material makeup of components of a particular wireless communication device in which the antenna device 10 is to be employed. In the illustrated embodiment depicted in FIG. 1, the cut out features 32 and 34 are not necessary for the operation of the antenna device 10, but are merely a non-functional feature to coincide with cutouts in the housing of the wireless communication device (not shown) used in conjunction with the depicted embodiment of FIG. 1.

The feed systems employed in the preferred embodiment depicted in FIG. 1 can be coaxial feedline cables, attached at on end to the rf signal source 19 having a radio transceiver 21 and a ground plane 23 and connected at the opposite end to the antenna device 10 at feed points 18 and 20 for slot 12 and at feed points 28 and 30 for slot 22. The center portion of the coaxial cable for slot 12 is operatively connected at feedpoint 18, and the grounded outer shield of the coaxial cable is operatively attached at feedline grounding point 20 such as by soldering. Similarly, for driven slot 22, the center portion of the coaxial feedline cable is attached to feedpoint 28, and the outer shield attached to feedline grounding point 30. These feedpoint pairs, 18, 20 and 28, 30 are placed so as to create a feedpoint with 50 ohm impedence. Crimps, bends, notches, holes or other features (not shown) produced in the conductive sheet 11 can be used to accurately mark the 50 ohm feedpoints, enabling fast, accurate placement of feedlines during mass production assembly. Alternative feed approaches may also be utilized, including but not limited to micro-strip transmission line(s).

In yet another embodiment of the present invention, additional slot features (not shown in the illustrations) can be made on the antenna device 10. A corresponding additional slot feature can be incorporated along with each of the previously described slot features 12 and 22. The additional corresponding slot features can be coupled to the same feed lines as are used to service the slots 12 and 22 respectively. In one such embodiment, the IEEE 802.11 wireless protocol using the frequency band centered ground 5.8 GHz can be useful, thus allowing such an embodiment of the antenna device 10 to serve as a multi-band antenna for multiple frequency response capability. The additional corresponding slot features for the additional frequency bands may have substantially similar shape as the primary slots 12 and 22, yet are scaled in dimensions to match the frequency band desired. Such scaling of dimensions can be readily accomplished by one skilled in the art, within a reasonable amount of experimentation, in order to enable the proper tuned response of the multiple frequencies. The slots fed as shown are electrically ½ wavelength long. In another embodiment (not shown), the slots may have a ¼ wavelength slot length.

In additional embodiments, the driven slots, 12 and 22 can also be constructed as an arcuate shaped slot or a meander shaped slot to conserve space and reduce the overall size of the wireless communication device, although such shapes may reduce the performance of the antenna device.

Figure 2:
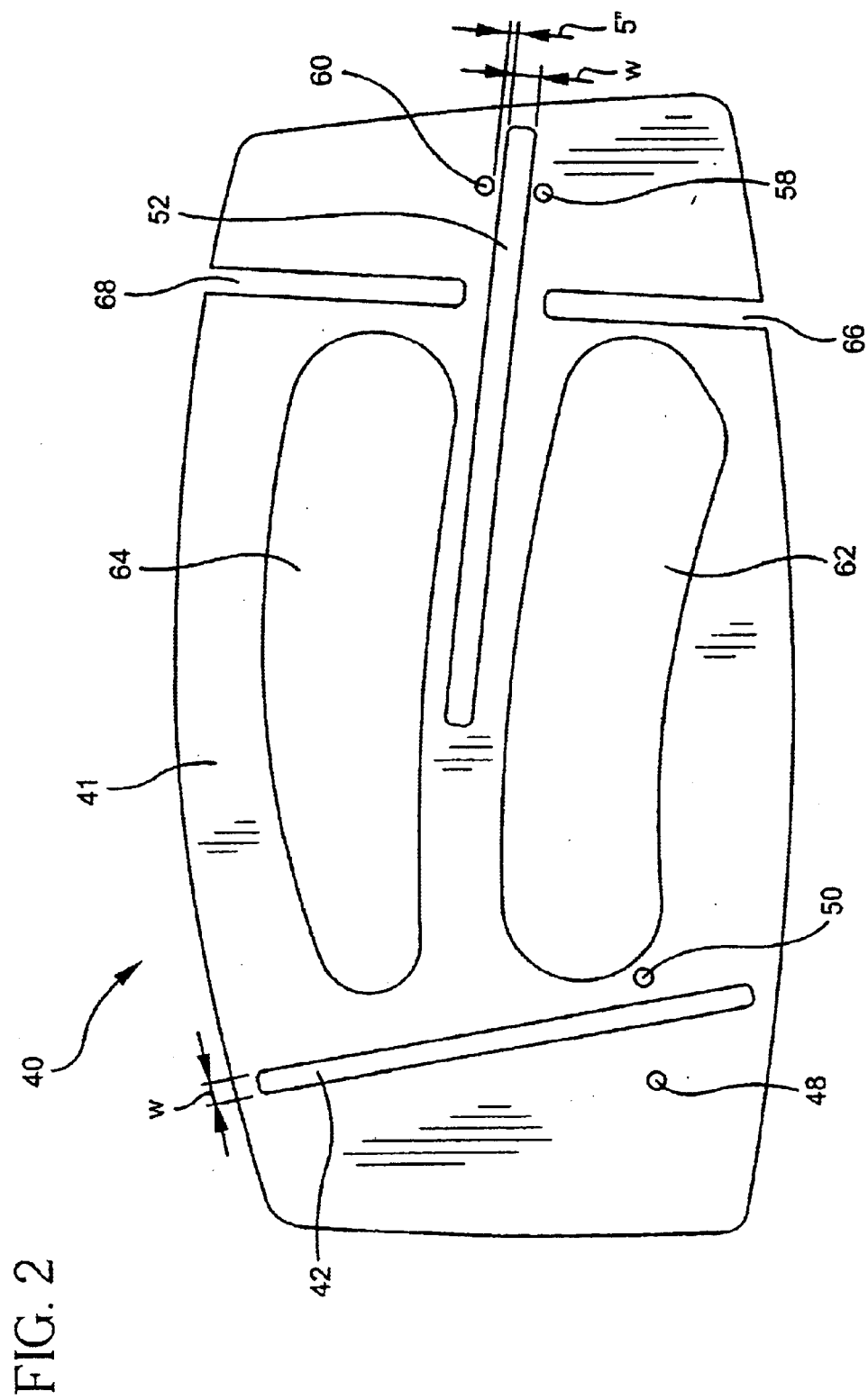
FIG. 2 illustrates the dimensions to produce an antenna embodiment of FIG. 2, which is tuned to operate on the IEEE 802.11 wireless data transfer protocol at 2.4 GHz.

FIG. 2 illustrates a substantially planar embodiment of a single layer diversity antenna device 40, which features both spatial and polarization diversity. As previously stated, the antenna device can be fabricated using thin sheet metal such as copper, brass, or tin-plated steel, or other conductive materials as would be known to those skilled in the art. In a preferred embodiment, tin-plated steel can be used having a steel thickness on the order of 0.010 inch and tin plating thickness on the order of 0.001 inch. The conductive sheet 41 can be shaped and the proper features produced using common manufacturing techniques known in the art. Two such manufacturing methods which are commonly know in the art would be milling and stamping, although other methods which are capable of producing the desired features could also be employed. The primary features which are needed to produce the antenna device 40 from a conductive sheet 41 are the driven slots 42 and 52. In this particular embodiment, featuring polarization diversity, the slots 42 and 52 are substantially perpendicular. The frequency band is primarily controlled by the electrical length of the slots 42 and 52 which are defined out of the sheet of conductive material 41.

In the illustrated embodiment which is designed for the IEEE 802.11 wireless communication protocol with the frequency band centered ground 2.4 GHz, the slots 42 and 52 are created as simple straight slots, without the rounded ends shown in the embodiment 10 of FIG. 1, although rounded ends (not shown) could certainly be employed to reduce size of the antenna 40 shown in FIG. 2.

The width, "w," of the slots 42 and 52 can be adjusted for tuning the performance of the antenna device 40 which may be necessary due to variations in the size dimensions and material makeup of components of a particular wireless communication device in which the antenna device 40 is to be employed. In the illustrated embodiment depicted in FIG. 2 the cut out features 62 and 64 are not necessary for the operation of the antenna device 40, but are merely a decorative feature to coincide with cutouts in the housing of the wireless communication device (not shown) which was used in conjunction with the depicted embodiment of FIG. 2.

The feed systems employed in the preferred embodiment depicted in FIG. 2 can be coaxial feedline cables, attached at on end to the radio transceiver (not shown), and connected at the opposite end, to the antenna device 40 at feed points 48 and 50 for slot 42 and at feed points 58 and 60 for slot 52. The center portion of the coaxial cable for slot 42 is operatively connected at feedpoint 48, and the grounded outer shield of the coaxial cable is operatively attached at feedline grounding point 50 such as by soldering. Similarly, for driven slot 52, the center portion of the coaxial feedline cable is attached to feedpoint 58, and the outer shield attached to feedline grounding point 60. These feedpoint pairs, 48, 50 and 58, 60 are placed so as to create a feedpoint with 50 ohm resistance. Crimps, bends, notches, holes or other features (not shown) produced in the conductive sheet 41 can be used to accurately mark the 50 ohm feedpoints, enabling fast, accurate placement of feedlines during mass production assembly. The cutout features 66 and 68 on antenna device 40, are optional decoupling elements, used in this particular type of embodiment to decouple the slot 52 from the cutout features 62 and 64 and are optional features for other embodiments which do not have cutout features such as 62 and 64. Alternative feed approaches may also be utilized, including but not limited to micro-strip transmission line(s).

Figure 3:
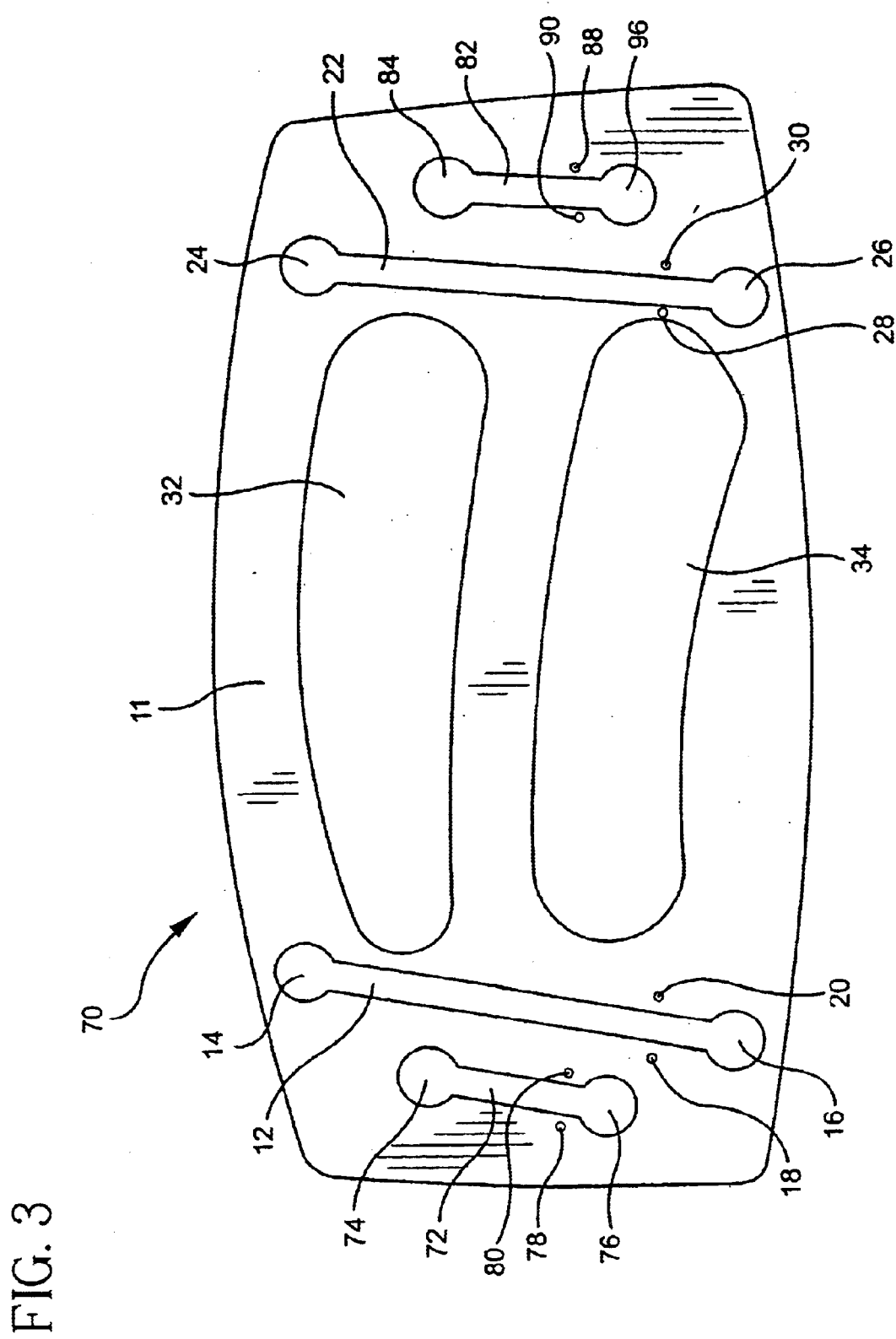
FIG. 3 illustrates a substantially planar embodiment of a dual frequency single layer spatial diversity antenna.

In yet another embodiment of the present invention, multi-band operation can be realized, by providing additional slot features as illustrated in one such possible embodiment in FIG. 3. The antenna device embodiment 70 retains all of the basic features of antenna device 10 plus additional features to create a dual band diversity antenna. The additional features depicted in FIG. 3 to create antenna device embodiment 70 are as follows. Additional slot features 72 and 82 are cut into the conductive sheet 11, where the effective electrical length of the slots 72 and 82 correspond to ½ wavelength of the desired operating frequency of said second frequency band. As with embodiment 10, the features 32 and 34 of embodiment 70 are not necessary, and merely facilitate the physical form factor of a particular wireless device. The rounded oversized end features 74, 76, 84 and 86 are optional features which serve to shorten the physical length of the slots 72 and 82 respectively, in the same manner as described above for the rounded ends 14, 16, 24 and 26, of antenna device embodiment 10. As will be obvious to those skilled in the art, the rounded ends 14, 16 24 and 26 are optional, and would not be needed if the antenna has slots with actual length in the range of ½ wavelength of the desired frequency. Furthermore, other end-loading shapes could be employed to produce the invention in embodiments desiring physically smaller features than ½ wavelength. Likewise, additional embodiments of the invention may also be produced which feature multiband operation including a plurality of slot features to produce the plurality of desired frequency bands of operation, as would be known or could be built by those skilled in the art within the scope of the invention, without requiring an undue amount of experimentation. The antenna device embodiment 70 may employ additional separate feedlines (not shown) to be operatively connected to points 78 and 80 for slot feature 72, and connected to points 88 and 90 for slot feature 82. However, the dual band antenna device embodiment 70 may also be built using only the two feed lines described in antenna device 10, where the additional slots 72 and 82 would be fed through parasitic coupling from the slots 12 and 22, along with their corresponding feedlines, connected at feed points 18, 20, 28 and 30 respectively. Additionally, other embodiments within the scope of the invention, could use alternative feeding systems as are known or would be developed by those skilled in the art.

Figure 4:
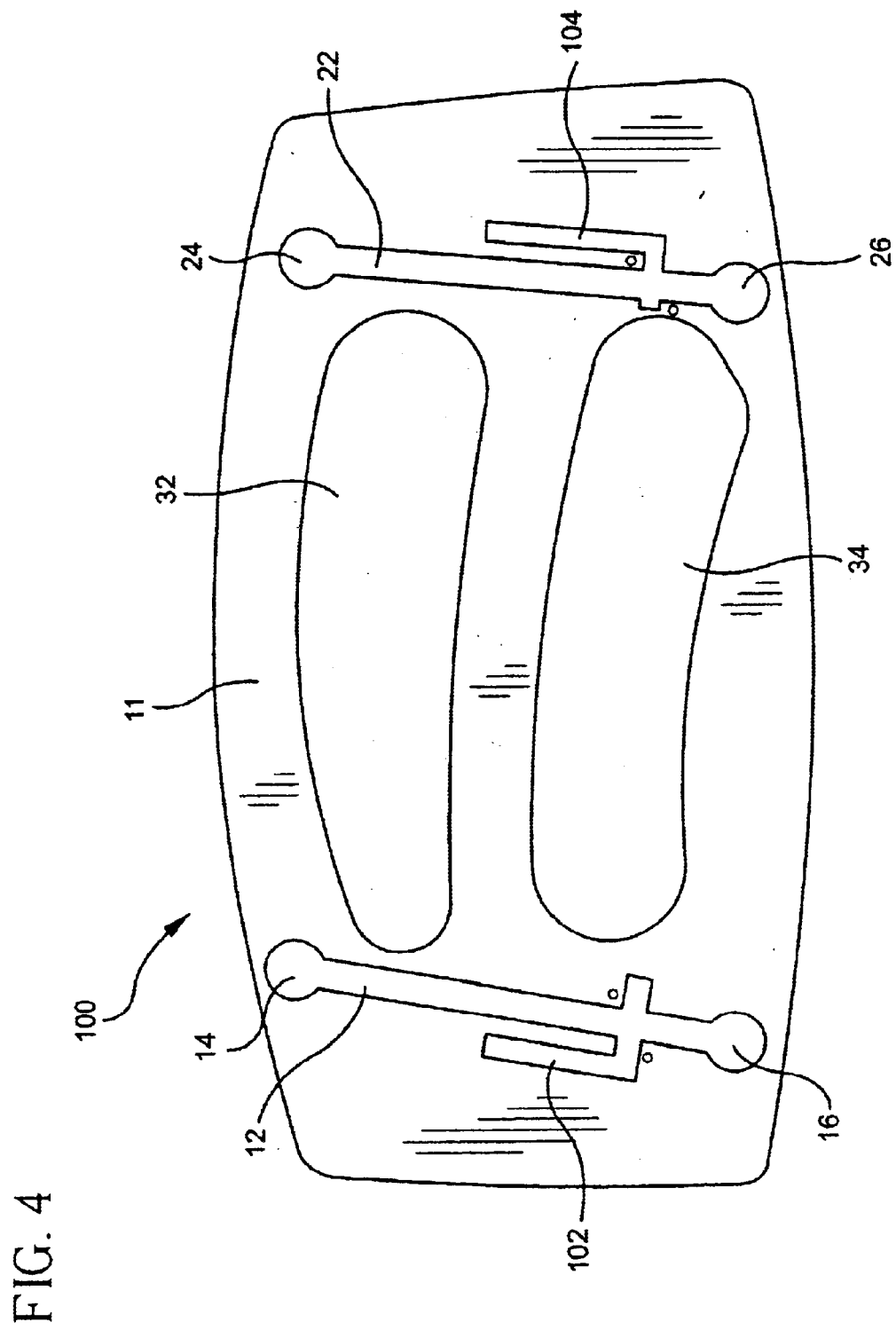
FIG. 4 illustrates a substantially planar embodiment of another dual frequency single layer spatial diversity antenna.

An example of an alternate multi-band embodiment of the invention is depicted in FIG. 4, where only a single feedline is used for each pair of dual band antenna slots comprising the diversity antenna system of the present invention. In the antenna device embodiment 100 depicted in FIG. 4, the primary frequency band slots 12 and 22 are supplemented with second frequency band slot features 102 and 104 respectively. In this present antenna device embodiment 100 the feed points 18 and 20 can be used to service both frequencies, as provided by slot features 12 and 102. Likewise, the feedpoints 28 and 30 as depicted in the FIG. 1 can be used to service to bath frequencies as provided by slot features 22 and 104. As will be obvious to those skilled in the art, other slot shapes and configurations capable of providing multi-frequency bands of operation, would also fall within the scope of the present invention. Thus, additional slot features can also be incorporated along with each of the previously described slot features 12, 22, 102 and 104. The additional corresponding slot features can be coupled to the same feed lines, or can be fed by separate feed lines (not shown). The additional corresponding slot features for the additional frequency bands may have substantially similar shape as the primary slots 12 and 22, yet are scaled in dimensions to match the frequency band desired. Such scaling of dimensions can be readily accomplished by one skilled in the art, within a reasonable amount of experimentation, in order to enable the proper tuned response of the multiple frequencies. The longest dimension of the additional slots could have an effective electrical length on the order of either ¼ or ½ wavelength.

Figure 5:
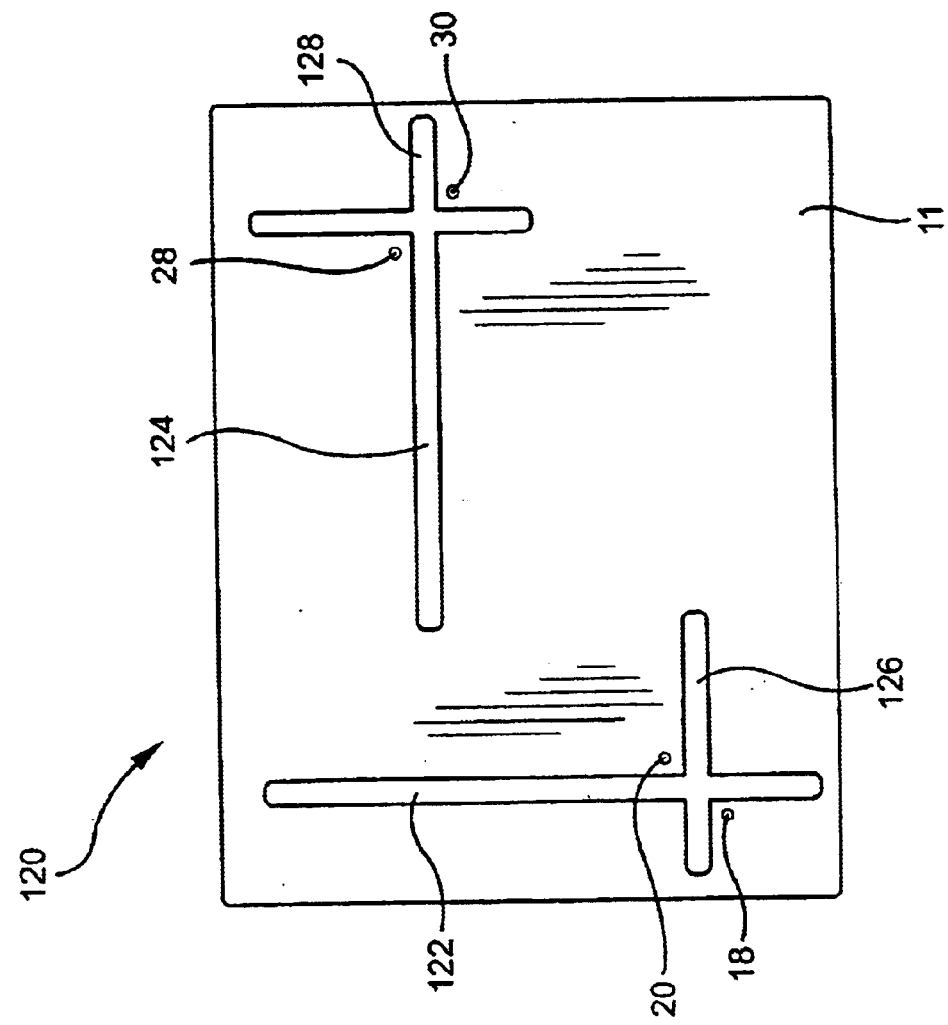
FIG. 5 illustrates a substantially planar embodiment of another dual frequency single layer spatial diversity antenna.

Another embodiment of a multi-band antenna according to the present invention is illustrated in FIG. 5. The primary frequency band slots 122 and 124 are supplemented with second frequency band slot features 126 and 128, respectively. In this present antenna device embodiment 120 the feed points 18 and 20 can be used to service both frequencies, as provided by slot features 122 and 126. Likewise, the feedpoints 28 and 30 as depicted in the FIG. 5 can be used to service to both frequencies as provided by slot features 124 and 128. As will be obvious to those skilled in the art, other slot shapes and configurations capable of providing multi-frequency bands of operation, would also fall within the scope of the present invention. Thus, additional slot features can also be incorporated along with each of the previously described slot features 122, 124, 126, 128. The additional corresponding slot features can be coupled to the same feed lines, or can be fed by separate feed lines (not shown). The additional corresponding slot features for the additional frequency bands may have substantially similar shape as the primary slots 122 and 124, yet are scaled in dimensions to match the frequency band desired. Such scaling of dimensions can be readily accomplished by one skilled in the art, within a reasonable amount of experimentation, in order to enable the proper tuned response of the multiple frequencies. The longest dimension of the additional slots could have an effective electrical length on the order of either ¼ or ½ wavelength.

In additional embodiments (not shown), the driven slots, 122 and 124 can also be constructed as arcuate-shaped slots or as meander-shaped slots to conserve space and reduce the overall size of the wireless communication device, although such shapes may reduce the performance of the antenna device. Although the invention has been described in connection with particular embodiments thereof other embodiments, applications, and modifications thereof which will be obvious to those skilled in the relevant arts are included within the spirit and scope of the invention.

We claim:

1. A diversity slot antenna for a wireless communications device having an RF signal transceiver and a ground plane, said antenna comprising:
   a conductive element;
   a first slot and a second slot, each slot being defined upon the conductive element and having a pair of generally opposed elongated sides;
   a first signal conductor being coupled proximate to one of the pair of generally opposed elongated sides of the first slot, said first signal conductor being coupled to the RF signal transceiver;
   a second signal conductor being coupled proximate to one of the pair of generally opposed elongated sides of the second slot, said second signal conductor being coupled to the RF signal transceiver;
   a first ground conductor being coupled proximate to the other of the pair of generally opposed elongated sides of the first slot, wherein a portion of the first slot extends between the first signal conductor and the first ground conductor, said first ground conductor being coupled to the ground plane; and
   a second ground conductor being coupled proximate to the other of the pair of generally opposed elongated sides of the second slot, said second ground conductor being coupled to the ground plane.

2. The diversity slot antenna according to claim 1, wherein each of the slots has an electrical length of approximately ½ of an operational wavelength.

3. The diversity slot antenna according to claim 1, wherein the pair of elongated slots are aligned to be substantially parallel.

4. The diversity slot antenna according to claim 1, wherein the pair of elongated slots are aligned to be substantially orthogonal.

5. The diversity slot antenna according to claim 1, wherein at least one of the pair of slots has an enlarged end portion for increasing the electrical length of the slot.

6. The diversity slot antenna according to claim 1, wherein the conductive element is a sheet metal element.

7. The diversity slot antenna according to claim 1, wherein the conductive element is a conductively plated plastic element.

8. The diversity slot antenna according to claim 1, further comprising:

a second pair of elongated slots, each slot having generally opposed sides and being defined upon the conductive element, said second pair of elongated slots operatively functioning over a second frequency band of operation.

9. A method of manufacturing a diversity slot antenna for a wireless communications device having a signal conductor and a ground plane, said method comprising the steps of:

providing a conductive element;

defining upon the conductive element a pair of elongated slots having generally opposed sides;

connecting a first pair of conductors including a signal conductor and a ground conductor at the sides of one of the elongated slots, whereby a portion of said one elongated slot extends between the first pair of conductors; and connecting a second pair of conductors including a signal conductor and a ground conductor a the sides of the other of the pair of elongated slots, whereby a portion of said other elongated slot extends between the second pair of conductors.

10. The method of manufacturing a diversity slot antenna of claim 9, wherein the step of defining upon the conductive element includes the step of performing a metal stamping process upon the conductive element.

11. The method of manufacturing a diversity slot antenna of claim 9, wherein the step of defining upon the conductive element includes the step of performing a metal machining process upon the conductive element.

12. The method of manufacturing a diversity slot antenna of claim 9, wherein each of the slots has an electrical length of approximately ½ of an operational wavelength.

13. The method of manufacturing a diversity slot antenna of claim 9, wherein the pair of elongated slots are aligned to be substantially parallel.

14. The method of manufacturing a diversity slot antenna of claim 9, wherein the pair of elongated slots are aligned to be substantially orthogonal.

15. The method of manufacturing a diversity slot antenna of claim 9, wherein at least one of the pair of slots has an enlarged end portion for effectively increasing the electrical length of the slot.

16. The method of manufacturing a diversity slot antenna of claim 9, wherein the conductive element is a sheet metal element.

17. The method of manufacturing a diversity slot antenna of claim 9, wherein the signal conductor and the ground plane are coupled proximate to ends of the slots.

18. A diversity slot antenna for a wireless communications device having an RF signal transceiver and a ground plane, said antenna comprising:

a conductive element;

a first slot and a second slot, each slot being defined upon the conductive element and having a first end;

a first signal conductor being coupled proximate to the first end of the first slot, said first signal conductor being coupled to the RF signal transceiver;

a second signal conductor being coupled proximate to the first end of the second slot, said second signal conductor being coupled to the RF signal transceiver;

a first ground conductor being coupled proximate to the first end of the first slot, whereby a portion of the first slot extends between the first signal conductor and the first ground conductor, said first ground conductor being coupled to the ground plane; and a second ground conductor being coupled proximate to the first end of the second slot, whereby a portion of the second slot extends between the second signal conductor and the second ground conductor, said second ground conductor being coupled to the ground plane.

19. The diversity slot antenna according to claim 18, wherein the pair of elongated slots are aligned to be substantially parallel.

20. The diversity slot antenna according to claim 18, wherein the pair of elongated slots are aligned to be substantially orthogonal.

21. The diversity slot antenna according to claim 18, wherein at least one of the pair of slots has an enlarged end portion for increasing the electrical length of the slot.

* * * * *